United States Patent Office 3,535,286
Patented Oct. 20, 1970

3,535,286
TEREPHTHALIC ACID-PHENYL INDANE DICARBOXYLIC ACID COPOLYESTER RESIN
William O. Deeken, Stow, Max H. Keck, Cuyahoga Falls, and Maria V. Wiener, Akron, Ohio, assignors to The Goodyear Tire & Rubber Company, Akron, Ohio, a corporation of Ohio
No Drawing. Filed Apr. 10, 1968, Ser. No. 720,350
Int. Cl. C08g *17/08*
U.S. Cl. 260—75         8 Claims

ABSTRACT OF THE DISCLOSURE

The invention relates to a new family of resins which are copolyesters of ethylene glycol, terephthalic acid and phenyl indane dicarboxylic acid, 3-(4-carboxphenyl)-1,1,3-trimethyl-5-indane carboxylic acid. The copolyesters have high glass temperatures and fibers of the copolyesters have improved dye receptivity. Fibers having high free shrink properties are formed from crystallizable copolyesters of the series.

---

This invention relates to new copolyester resins and to improved polyester filaments, films and other products produced therefrom.

Polyethylene terephthalate which is used for the manufacture of fibers and films has desirable physical properties such as high mechanical strength, low water absorption and resistance to many chemicals. Fibers of this resin are resistant to penetration by disperse dyes and generally require a carrier or swelling agent to facilitate dyeing. For some uses polyethylene terephthalate crystallizes too rapidly. While the undesirably high crystallization tendency of polyethylene terephthalate can be reduced by replacing part of the terephthalic acid or the glycol by compounds that by their constitution reduce the tendency of the resin to crystallize, most of such compounds do not substantially improve the undesirable properties of the polymer. Furthermore, such compounds generally reduce the glass temperature of the resin and for some purposes this reduces the utility of the polymer.

The present invention provides a new family of copolyesters. These new copolyesters have many of the desirable properties of polyethylene terephthalate and also have additional valuable properties such as improved dye receptivity, broader softening point range, reduced tendency to crystallize and higher glass temperatures. The copolyesters are copolymers of ethylene glycol, terephthalic acid and phenyl indane dicarboxylic acid.

Copolymers containing up to 15 mol percent of ethylene phenyl indanate units are crystallizable and are useful in the preparation of oriented fibers and films. Copolymers containing 20 mol percent or more of ethylene phenyl indanate are amorphous materials that are clear and are useful in molded products.

Of the crystallizable copolymers the materials which contain from 2.5 to 10.0 mol percent of ethylene phenyl indanate units are capable of forming fibers having high retractability. Thus oriented structures of these resins can be free-shrunk at least 10 percent of their length by heating them in unrestrained state. Filaments, fibers and films having low shrinkage properties can also be made from these new resins.

Fibers of these resins have greater affinity for disperse dyes than do fibers of polyethylene terephthalate. This property is of considerable interest because filaments of aromatic polyester resins are more difficult to dye than are natural fibers or fibers of regenerated cellulose or protein fibers. They can be dyed with dispersed dyestuffs without using a carrier to assist the dyeing. Various disperse dyes such as Duranol Blue G, Dispersol Scarlet T, Dispersol F, Orange B and Duranol Br Yellow Tr can be used.

The copolyesters can be made by reacting ethylene glycol with terephthalic acid and phenyl indane dicarboxylic acid or by reacting ethylene glycol with ester-forming derivatives of terephthalic acid such as the lower alkyl esters and other recognized varieties and then with phenyl indane dicarboxylic acid, or by reacting ethylene glycol with ester-forming derivatives of the acids such as the lower alkyl esters and other recognized varieties of terephthalic acid and of phenyl indane dicarboxylic acid. Phenyl indane dicarboxylic acid is the term used herein for the acid 3-(4 carboxyphenyl 1,1,3-trimethyl-5-indane) carboxylic acid,

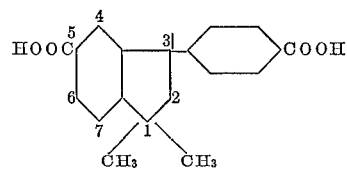

For products to have good properties the copolyesters should have a high molecular weight, i.e., an intrinsic viscosity of at least 0.3 and preferably at least 0.5.

In the following examples parts and percentages are by weight unless otherwise indicated.

EXAMPLE 1

Preparation of 95/5 ethylene terephthalate ethylene phenylindanate copolyester 64.8 grams (.2 mol) of phenylindane dicarboxylic acid, 631 grams (3.8 mols) of terephthalic acid, 644 grams (10.4 mols) ethylene glycol, 0.237 gram of manganese acetate and 0.237 gram of antimony oxide were placed in a two liter three neck flask. The mixture was heated and stirred at 192 to 199° C. for about 12 hours, during which time 235 cc. of water distilled out of the reaction mixture. The pressure in the system was then reduced to about 0.1 millimeter of mercury pressure for 30 minutes at 199 to 268° C. 260 grams of low molecular weight polymer were obtained.

The low molecular weight polymer was tarnsferred to a one liter glass reaction flask and polymerized under 0.1 millimeter of mercury pressure at 270 to 285° C. temperature range for 80 minutes. The resulting polymer was extruded through an orifice in the bottom of the reactor flask. It had an intrinsic viscosity of 0.756, as determined in a 60/40 phenol-tetrachloroethane mixed solvent at 30.0° C.

EXAMPLE 2

Preparation of 90/10 ethylene terephthalate/ethylene phenylindanate copolyester

A glass flask having a capacity of 12 liters was charged with 1561 grams of ethylene glycol, 1911 grams of dimethyl terephthalate, and 3.2 milliliters of a solution of manganese octylene glycolate (containing 6 percent manganese calculated as the metal). This mixture was heated and stirred for 100 minutes, the temperature rising during this period from 25° C. to 215° C. A total of 820 milliliters of methanol distilled from the reaction flask during this heating period. The reaction product was then transferred to a metal polymerization vessel and 353.8 grams of phenylindane dicarboxylic acid were added. The mixture was stirred and heated for 60 minutes at 215 to 220° C. Then 0.567 gram $Sb_2O_3$ and 29.8 grams of $TiO_2$ were added and the pressure was reduced to 1.5 millimeters of mecury pressure over a 60 minute period while the temperature was raised from 220 to 270° C. An additional three hours of reaction at 0.1 millimeter of mercury pressure and 270° C. provided a copolymer having an intrinsic viscosity of .615.

Intrinsic viscosity as recorded for the resins is defined as limit $$\frac{\ln(\eta r)}{C}$$

as C approaches 0 in which $\eta r$ is the viscosity of a dilute solution of the resin in a 60/40 phenol-tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution.

TABLE I.—PROPERTIES OF THE POLYMERS

| Composition | Molar ratio | I.V. | Melting or flow, °C. | Softening point, °C. | $T_g$, °C. | Density, q. |
|---|---|---|---|---|---|---|
| EPIn | 100 | 0.51 | 218 (flow) | 148 | 158 | 1 162 |
| ET/PIn | 95/5 | 0.757 | 215 (cr.) | 80 | 92 | |
| ET/PIn | 90/10 | 0.771 | 231 (cr.) | 84 | | 1 303 |
| ET/PIn | 85/15 | 0.775 | 220 (cr.) | 90 | 100 | 1 289 |
| ET/PIn | 80/20 | 0.807 | 191 (flow) | 94 | | 1 268 |
| ET/PIn | 70/30 | 0.640 | 172 (flow) | 103.5 | | 1 253 |
| ET | 100 | 0.65 | 265 (cr.) | | 80 | |

NOTE.—E—ethylene; PIn—phenylindane dicarboxylate; T—terephthalate; $T_g$—glass transition temperature; q.—quenched; cr.—crystalline.

The time of flow of each solution and of the solvent was measured in a No. 1 Ubbelohde Viscosimeter at 30.0° C. and these times were used in the respective viscosities in the equation above.

Three different polyester fabrics were compared in a disperse dyeing test, in 3.5 percent Duranol Blue G. The fabrics were dyed in the absence of a carrier for one hour at boiling tempearture. Results were as follows:

92.5/7.5 polyethylene terephthalate/phenylindanate—deep blue

90/10 polyethylene terephthalate/isophthalate—medium blue

90/1 polyethylene terephthalate—light blue

The copolyesters of the invention can be formed into filaments by melt extrusion. Such filaments have high free shrink characteristics. Shrink properties of filaments of this invention are compared with shrink properties of filaments of ethylene terephthalate and certain ethylene terephthalate copolyesters in Table II below.

TABLE II.—COMPARISON OF FREE-SHRINK BEHAVIOR OF DRAWN FIBERS, NOT HEAT SET

| Polyester composition | I.V. | Free-shrink percent |
|---|---|---|
| 00/0 ethylene terephthalate (control) | 0.62 | 18 |
| 90/10 ethylene terephthalate/isophthalate | 0.62 | 23 |
| 95/5 ethylene terephthalate/phenylindanate | 0.756 | 70 |
| 90/10 ethylene terephthalate/phenylindanate | 0.640 | 68 |
| 80/20 ethylene terephthalate/phenylindanate | 0.715 | ca. 80 |

Fibers made from resins of the invention can be prepared by melt extrusion, as stated above, and by other suitable methods such as spinning from solution in a suitable solvent. Such fibers can be oriented and are usually oriented by cold drawing. If desired, the fibers can be heat set by heating them at elevated temperature while maintaining them under tension according to known practices. Thus fibers of the invention having low shrinkage properties can also be made by heat setting the fibers under tension. A suitable heat setting process is as follows.

A fiber to be heat set is wrapped around a heated roll maintained at a constant temperature and onto another roll to advance the fiber. The heated roll is equipped with a means for varying its speed of rotation so that by varying the rotational speed of the roll and the number of times the fiber is wrapped around the heated roll and by varying the speed of the roll, the time the fiber is exposed to heat to set it, and thus the extent of heat setting, can be regulated.

Data for a 90/10 polyethylene terephthalate/ethylene phenylidanate copolymer are as follows:

| Heat set time [1]: | Percent free shrink remaining |
|---|---|
| 0 | 68 |
| 5 | 56 |
| 10 | 45 |
| 20 | 30 |
| 60 | 12 |

[1] Seconds/5 wraps over a 115° C. roll.

Physical properties of a heat set fiber are as follows:

Before 10 minute boil-off in water:
- Den./fil. _____ 3.06
- Tenacity, g./d. _____ 5.5
- Elongation, percent _____ 9.7
- Shrinkage, percent _____

After 10 minute boil-off in water:
- Den./fil. _____ 3.32
- Tenacity, g./d. _____ 4.57
- Elongation, percent _____ 46
- Shrinkage _____

The oriented heat set fibers of the invention have improved dyeing properties, high tenacity, low elongation and other desirable properties. Staple fibers of the copolyesters and particularly useful in textile applications, including blends with other staple fibers containing about 25 to 65 percent by weight of copolyester staple fiber and 75 to 35 percent by weight of another staple fiber. Blends of fibers can be used in manufacturing apparel such as men's and ladies' suits, sportswear, underwear, sport shirts, sweaters and dresses. Other uses will be in the manufacture of slip covers, sheets, mattress coverings and upholstery. Staple fibers to be mixed with the fibers of the copolyesters of this invention may be fibers such as cotton, silk, rayon, linen, wool, acrylic polymers and copolymers, nylon and polyester fibers such as polyethylene terephthalate and poly(1,4 cyclohexylene dimethylene terephthalate). Preferred blends are from 25 to 65 percent by weight of a copolyester of the invention with from 75 to 35 percent by weight of cotton and 25 to 65 percent by weight of a copolyester of the invention with from 75 to 35 percent by weight of wool.

Blends of the copolyester fibers with fibers having elastic properties are useful in stretch fabrics, sportswear, socks and in other applications where stretchable materials are desirable. Blends with elastic fibers such as Lycra are useful in stretch applications.

Fibers of the copolyesters having high shrinkage properties are particularly useful in blends with other fibers that have different shrink characteristics, particularly with fibers having low shrink characteristics.

Blends can also be made of continuous filaments of copolyesters of this invention with continuous filaments of other materials or the blends can be blends of staple fibers as well as mixtures of continuous filament and staples. Such blends are useful for making bulkable composite yarns, bulky yarns, crimped fibers and fabrics. Blends of fibers having differential shrink characteristics are particularly useful in permanently creased garments, heat insulation fabrics, texturized fabrics, rugs and carpets.

The copolyesters of this invention are valuable film forming materials and films can be made from the copolyesters by melt extrusion or other suitable methods. Orientation or stretching improves properties of the films. Films and foils of the polyesters have good clarity and a brilliant luster. They are characterized by high tensile strength and low elongation, good age life and excellent electrical properties. They are particularly useful in packaging applications, magnetic tapes, electrical insulation and other applications where high strength clear films are utilized. Films of the crystallizable copolyesters which contain from 2.5 to 15 mol percent of ethylene phenyl indanate and from 97.5 to 85 mol percent of ethylene terephthalate can be prepared in amorphous state by super cooling hot amorphous film before crystallization occurs. Such films can be readily oriented by warming and then stretching. They can be heat set according to known procedures as by heating such films while they are held under tension. Where biaxial orientation is desired the films can conveniently be stretched in two directions at right angles to each other.

For some uses it is desirable to stretch the film in only one direction, as for example, in the preparation of tapes for industrial uses. Stretching in one direction is readily accomplished by such methods as winding a film from one roll to another, the second roll rotating at a higher peripheral speed than the first roll. This stretching operation can be accomplished by methods familiar to those skilled in the art and is facilitated by warming the film by some suitable means just prior to the actual stretching of the film. Films of the copolyesters that have been stretched but not heat set have high shrink characteristics and are useful in packaging applications in which a shrunk, tightly fitting film cover is required.

The amorphous copolyesters which contain at least 20 mol percent of ethylene phenyl indanate and 80 mol percent or less of ethylene terephthalate, such as the 80/20, 75/25, 70/30, 60/40, 50/50 and 40/60 ratios, are useful for making molded articles, amorphous films and coatings. They form clear articles having improved glass transition temperatures.

While the copolyesters will generally be used without further compounding they can be compounded with other materials if desired. Compatible resins, elastomers, pigments, flatting agents, dyes, plasticizers and other compounding ingredients can be added either by mixing the materials together on a suitable mill or other mixing apparatus, or by mixing in such compounding ingredients in solutions of the polyesters in a solvent.

While certain representative embodiments and details have been shown for the purpose of illustrating the invention it will be apparent to those skilled in this art that various changes and modifications may be made therein without departing from the spirit or scope of the invention.

What we claim is:

1. A film and fiber forming linear ethylene terephthalate-ethylene phenyl indanate copolyester in which the ethylene terephthalate units comprise from 97.5 to 40 percent of the sum of the ethylene terephthalate and ethylene phenyl indanate units in the copolyester and the ethylene phenyl indanate units comprise from 2.5 to 60 percent of said sum.

2. A copolyester according to claim 1 in which the ethylene terephthalate units comprise from about 97.5 to about 85 percent of the sum of the ethylene terephthalate and ethylene phenyl indanate units in the copolyester and the ethylene phenyl indanate units comprise from about 2.5 to about 15 percent of said sum.

3. A copolyester according to claim 1 in which the ethylene terephthalate units comprise from about 80 to about 40 percent of the sum of the ethylene terephthalate and ethylene phenyl indanate units in the copolyester and the ethylene phenyl indanate units comprise from about 20 to about 60 percent of said sum.

4. A copolyester according to claim 3 in the form of a film.

5. A copolyester according to claim 3 in the form of a molded product.

6. A film and fiber forming linear ethylene terephthalate-ethylene phenyl indanate copolyester in which the ethylene terephthalate units comprise from about 97.5 to about 90 percent of the sum of the ethylene terephthalate and ethylene phenyl indanate units in the copolyester and the ethylene phenyl indanate units comprise from about 2.5 to about 10 percent of said sum.

7. A copolyester according to claim 6 in the form of a fiber having a free shrinkage of at least 10 percent and a glass transition temperature of at least 85.

8. A copolyester according to claim 6 in the form of a film.

References Cited
UNITED STATES PATENTS

| | | | |
|---|---|---|---|
| 2,873,262 | 2/1959 | Petropoulos | 260—22 |
| 3,380,968 | 4/1968 | Ridgway | 260—78 |
| 3,383,368 | 5/1968 | Ridgway | 260—78 |

OTHER REFERENCES

Steitz et al. in Abstracts of Papers, 155th National Meeting, American Chemical Society, Q31 (Feb. 26, 1968).

Steitz et al., Phenylindane Dicarboxylic Acid—A New Polycondensation Monomer, paper given at 155th ACS National Meeting, San Francisco, Apr. 2, 1968.

HAROLD D. ANDERSON, Primary Examiner

M. GOLDSTEIN, Assistant Examiner

U.S. Cl. X.R.

8—55; 260—7.5, 9, 16, 857, 860, 873; 264—210, 288, 289

PO-1050
(5/69)

UNITED STATES PATENT OFFICE
CERTIFICATE OF CORRECTION

Patent No. 3,535,286                     Dated  October 20, 1970

Inventor(s) William O. Deeken, Max H. Keck & Maria V. Wiener

It is certified that error appears in the above-identified patent and that said Letters Patent are hereby corrected as shown below:

Column 2, lines 15-23, the formula should be changed as follows:

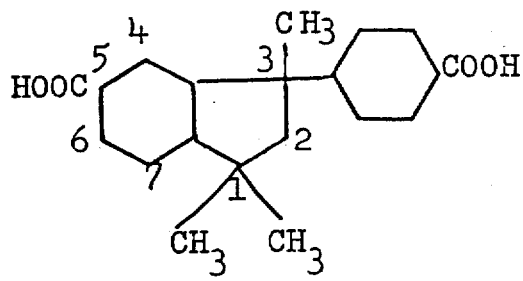

Column 2, line 44, "tarnsferred" should be -- transferred --

Column 3, line 8 " ᢒ r" should be --  ʰr --.

Column 3, Table I, the column headed "Density, q." the decimal point has been omitted from the figures in that column. They should read as follows:

1.162
--
1.303
1.289
1.268
1.253
--

Column 3, line 45 "90/1" should be omitted.

Column 3, Table II, in first line under "Polyester composition" the figures "00/0" should be -- 100/0 --.

Column 4, line 48 "and" should be -- are --.

Signed and sealed this 25th day of January 1972.

(SEAL)
Attest:

EDWARD M. FLETCHER, JR.
Attesting Officer

ROBERT GOTTSCHALK
Commissioner of Patents